United States Patent
Doi et al.

(10) Patent No.: US 12,003,624 B2
(45) Date of Patent: Jun. 4, 2024

(54) QUANTUM CRYPTOGRAPHIC COMMUNICATION SYSTEM, KEY MANAGEMENT INSPECTION DEVICE, KEY MANAGEMENT INSPECTION METHOD, AND COMPUTER PROGRAM PRODUCT

(71) Applicant: KABUSHIKI KAISHA TOSHIBA, Tokyo (JP)

(72) Inventors: Kazuaki Doi, Kawasaki Kanagawa (JP); Yoshimichi Tanizawa, Yokohama Kanagawa (JP); Toshiki Nakashima, Tokyo (JP); Mari Matsumoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 17/651,200

(22) Filed: Feb. 15, 2022

(65) Prior Publication Data
US 2022/0393864 A1    Dec. 8, 2022

(30) Foreign Application Priority Data
Jun. 4, 2021   (JP) ................. 2021-094118

(51) Int. Cl.
*H04L 9/08*   (2006.01)
(52) U.S. Cl.
CPC .................. *H04L 9/0852* (2013.01)
(58) Field of Classification Search
None
See application file for complete search history.

(56) References Cited

U.S. PATENT DOCUMENTS

2009/0185680 A1* 7/2009 Akiyama ............ H04L 9/3093
                                                              380/30
2018/0062837 A1* 3/2018 Tanizawa ............ H04L 9/0852
(Continued)

FOREIGN PATENT DOCUMENTS

JP          6666286 B2     3/2020

OTHER PUBLICATIONS

Alexander R. Dixon et al., "High-Speed Quantum Key Distribution Technology for Realization of Long-Term Stable Operation," TOSHIBA Review, vol. 70, No. 9 (2015).
(Continued)

*Primary Examiner* — Trang T Doan
(74) *Attorney, Agent, or Firm* — Finnegan, Henderson, Farabow, Garrett & Dunner, LLP

(57) ABSTRACT

A quantum-cryptographic-communication system according to an embodiment includes a key-integrated-management device, quantum-cryptography devices, and key-management-inspection devices. An inspection-target-value-calculating unit calculates an inspection-target value based on quantum-cryptography-device information related to a quantum-cryptography device. An expected-value-calculating unit calculates an expected value based on at least one of wiring information of a QKD link connected to the inspection-target-quantum-cryptography device; weather information of the site installed with the inspection-target-quantum-cryptography device; and the quantum-cryptography-device information. A permissible-value-calculating unit calculates a permissible value based on at least one of the wiring information, the weather information, and the quantum-cryptography-device information. A determining unit determines whether the inspection-target value is within the range of (expected value)−(permissible value) and within the range of (expected value)+(permissible value);
(Continued)

and, when the inspection-target value is outside the range of (expected value)−(permissible value) and outside the range of (expected value)+(permissible value), transmits anomaly detection to a key integrated management device.

13 Claims, 11 Drawing Sheets

(56) References Cited

U.S. PATENT DOCUMENTS

2018/0262328 A1    9/2018  Doi et al.
2018/0309571 A1*  10/2018  Arora .................. H04L 63/0435

OTHER PUBLICATIONS

R. Takahashi et al., "A high-speed key management method for quantum key distribution network," 11$^{th}$ Int'l Conf. on Ubiquitous and Future Networks (ICUFN 2019) (Zagreb, Croatia, 2019), pp. 437-442.

* cited by examiner

QUANTUM CRYPTOGRAPHIC COMMUNICATION SYSTEM, KEY MANAGEMENT INSPECTION DEVICE, KEY MANAGEMENT INSPECTION METHOD, AND COMPUTER PROGRAM PRODUCT

CROSS-REFERENCE TO RELATED APPLICATIONS

This application is based upon and claims the benefit of priority from Japanese Patent Application No. 2021-094118, filed on Jun. 4, 2021; the entire contents of which are incorporated herein by reference.

FIELD

Embodiments described herein relate generally to a quantum cryptographic communication system, a key management inspection device, a key management inspection method, and a computer program product.

BACKGROUND

By evolving the information communication technologies, diversified data is being increasingly communicated, and it has become a major challenge to secure the confidentiality and the security of the transmitted information. The quantum cryptographic communication technology is expected to be put into practical use as a cryptography technology that remains undecipherable even if a computational capacity of computers is improved.

According to the conventional technology, in a quantum cryptographic communication system, it is difficult to perform anomaly detection highly accurately.

DETAILED DESCRIPTION

A quantum cryptographic communication system according to an embodiment includes a key integrated management device, a plurality of quantum cryptography devices, and a plurality of key management inspection devices. Each of the plurality of key management inspection devices inspects a quantum cryptographic key generated by one of the plurality of quantum cryptography devices. Each of the plurality of key management inspection devices includes one or more hardware processors configured to function at least as an anomaly detecting unit. The anomaly detecting unit includes an inspection-target-value calculating unit, an expected-value calculating unit, a permissible-value calculating unit, and a determining unit. The inspection-target-value calculating unit calculates an inspection target value based on quantum cryptography device information related to a quantum cryptography device. The expected-value calculating unit calculates an expected value based on at least one of wiring information of a quantum cryptographic key distribution (QKD) link connected to the quantum cryptography device to be inspected, weather information of a site installed with the quantum cryptography device to be inspected, and the quantum cryptography device information. The permissible-value calculating unit calculates a permissible value based on at least one of the wiring information, the weather information, and the quantum cryptography device information. The determining unit determines whether or not the inspection target value is within a range of (the expected value)−(the permissible value) and within a range of (the expected value)+(the permissible value), and, when the inspection target value is outside the range of (the expected value)−(the permissible value) and outside the range of (the expected value)+(the permissible value), transmits anomaly detection to the key integrated management device.

Exemplary embodiments of a quantum cryptographic communication system, a key management inspection device, a key management inspection method, and a computer program product are described below in detail with reference to the accompanying drawings.

First Embodiment

To begin with, the explanation is given about an exemplary basic configuration of a quantum cryptographic communication system.

Exemplary Basic Configuration

Figure 1:
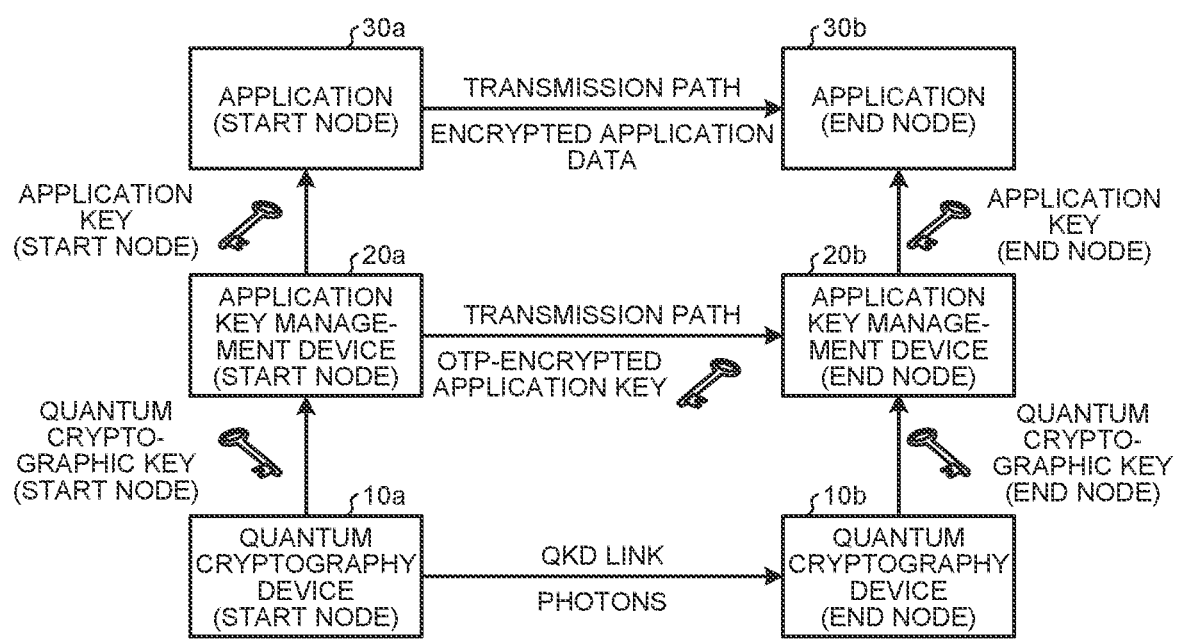
FIG. 1 is a diagram illustrating an exemplary basic configuration of a quantum cryptographic communication system according to a first embodiment.

FIG. 1 is a diagram illustrating an exemplary basic configuration of a quantum cryptographic communication system according to a first embodiment. Firstly, a quantum cryptography device 10a (a start node) transmits photons, which serve as the basis of a quantum cryptographic key, to a Quantum cryptography device 10b (an end node) via a quantum cryptographic key distribution (QKD) link. The quantum cryptography device 10a generates a quantum cryptographic key (the start node) based on the transmitted photons, and the quantum cryptography device 10b generates a quantum cryptographic key (the end node) based on the received photons. The quantum cryptographic key (the start node) and the quantum cryptographic key (the end node) represent shared bit data and are identical to each other. Then, the Quantum cryptography device 10a sends the quantum cryptographic key (the start node) to an application key management device 20a (a start node), and the quantum cryptography device 10b sends the quantum cryptographic key (the end node) to an application key management device 20b (an end node).

Subsequently, the application key management devices 20a and 20b share an application key. The application key is a cryptographic key used by an application 30a (a start node) in performing encrypted transmission of application data.

The following explanation is given about the method of sharing the application key. Fundamentally, the method of sharing is as explained in, for example, Non Patent Literature 2. Firstly, in the application key management device 20a, an application key is generated using a random number generator. Then, the application key management device 20a performs OTP encryption (OTP stands for One Time Pad) of the application key using a cryptographic key, and creates an (DIP-encrypted application key. Subsequently, the application key management device 20a sends the OTP-encrypted application key to the application key management device 20b. Herein, the OTP-encrypted application key is sent and received via a transmission line (wired or wireless) that connects the application key management devices 20a and 20b to each other. With respect to the OTP-encrypted application key, the application key management device 20b performs OTP decryption using the quantum cryptographic key, and restores the application key. In this way, the application key gets shared between the application key management device 20a and 20b.

The applications 30a and 30b obtain the application key at arbitrary timings from the application key management devices 20a and 20b, respectively. More particularly, after the application 30a retrieves the application key from the application key management device 20a, the application 30b obtains the same application key, which is same as the application key obtained by the application 30a, from the application key management device 20b.

Once the application key is shared between the applications 30a and 30b; at the time of transmitting application data, the application 30a encrypts the application data using the application key and transmits the encrypted application data. In this way, the explanation given till now was about the basic configuration.

Given below is the explanation of a configuration of the quantum cryptographic communication system according to the first embodiment achieved by adding a configuration for anomaly detection to the basic configuration illustrated in FIG. 1.

Exemplary Device Configuration

Figure 2:
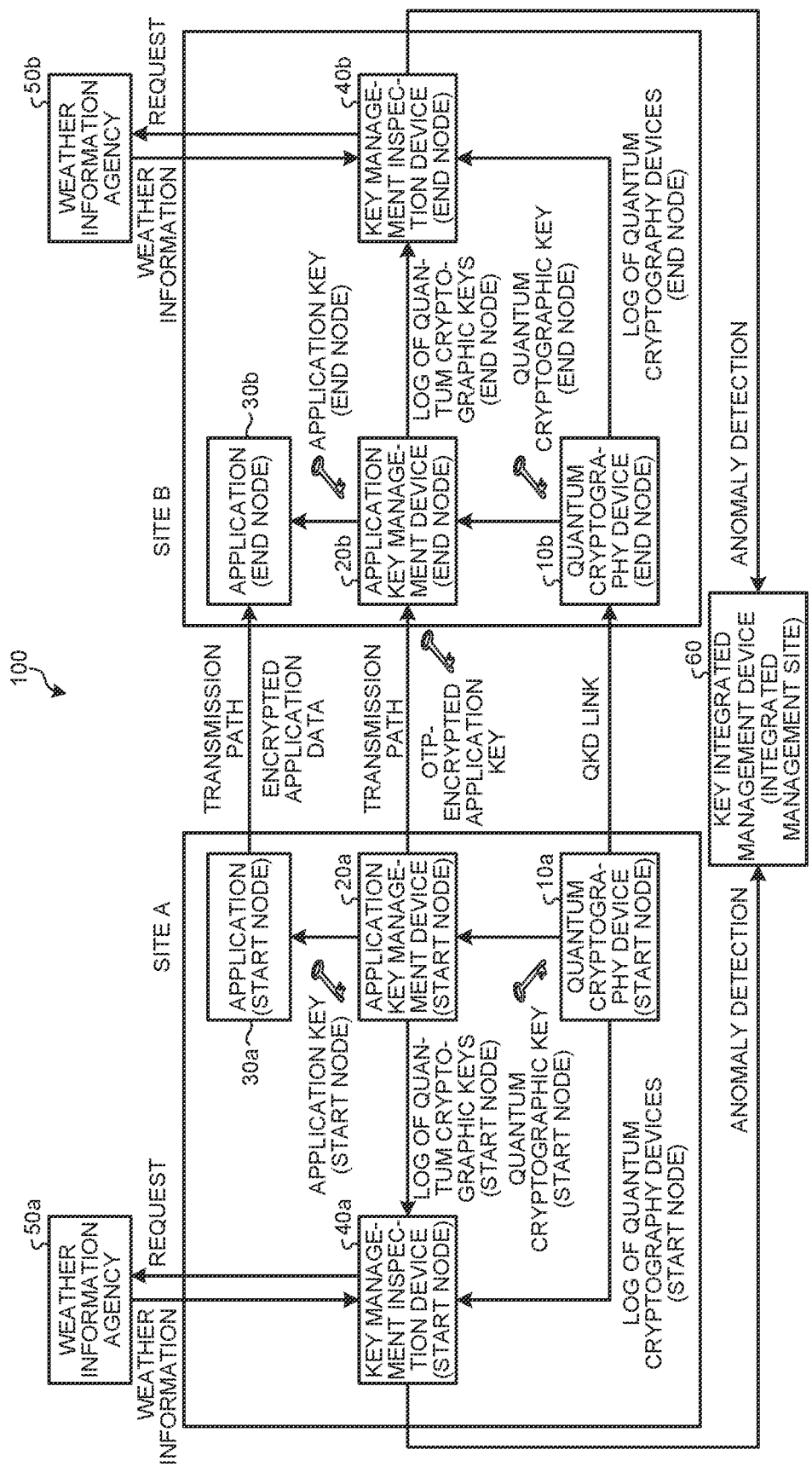
FIG. 2 is a diagram illustrating an exemplary configuration of the quantum cryptographic communication system according to the first embodiment.

FIG. 2 is a diagram illustrating an exemplary configuration of a quantum cryptographic communication system 100 according to the first embodiment. In the first embodiment, inspection is performed at each site, and anomaly detection is transmitted to a key integrated management device 60 located at the integrated management site. In the example illustrated in FIG. 2, sites A and B are illustrated. However, alternatively, in the quantum cryptographic communication system 100, communication can be mutually performed among three or more sites.

The quantum cryptographic communication system 100 according to the first embodiment includes the quantum cryptography device 10a, the application key management device 20a, the application 30a, a key management inspection device 40a, a weather information agency 50a, the quantum cryptography device 10b, the application key management device 20b, the application 30b, a key management inspection device 40b, a weather information agency 50b, and the key integrated management device 60.

The application key management device 20a, the application 30a, and the key management inspection device 40a operate at the site A. The weather information agency 50a can operate either at the site A or outside the site A. The application key management device 20b, the application 30b, and the key management inspection device 40b operate at the site B. The weather information agency 50B can operate either at the site B or outside the site B.

In the following explanation, when the quantum cryptography devices 10a and 10b need not be distinguished from each other, they are simply referred to as quantum cryptography devices 10. The same type of terminology is used regarding each of the following pairs: the application key management devices 20a and 20b, the applications 30a and 30b, the key management inspection devices 40a and 40b, and the weather information agencies 50a and 50b. Moreover, also regarding the configurations explained with reference to FIG. 3 and the subsequent drawings, the same type of terminology is used.

At each site, the key management inspection device 40 receives a log of quantum cryptographic keys from the corresponding application key management device 20; receives the weather information of the concerned site from the corresponding weather information agency 50; and accordingly inspects the quantum cryptographic communication system 100. The weather information either can be obtained as a response to a request issued by the key management inspection device 40, or can be periodically sent by the weather information agency 50 to the key management inspection device 40.

When any anomaly is detected, the key management inspection device 40 notifies the key integrated management device, which represents the integrated management site, about the anomaly detection. Then, the key integrated management device 60 takes various measures, such as stopping the generation of quantum cryptographic keys, with respect to the quantum cryptography device 10 in which the anomaly was detected and against the quantum cryptography device 10 that is sharing the quantum cryptographic key with the quantum cryptography device 10 in which the anomaly was detected.

Meanwhile, the quantum cryptography device 10a, the application key management device 20a, the application 30a, and the key management inspection device 40a either can be implemented using a start node configured with a single device (housing), or can be implemented using a combination of a plurality of devices. In an identical manner, the quantum cryptography device 10b, the application key management device 20b, the application 30b, and the key management inspection device 40b either can be implemented using a start node configured with a single device (housing), or can be implemented using a combination of a plurality of devices. Moreover, the device in which the applications 30a and 30b run is an arbitrary device such as a smart device or a personal computer.

Given below is the explanation of a configuration of the application key management device 20 at each site.

Figure 3:
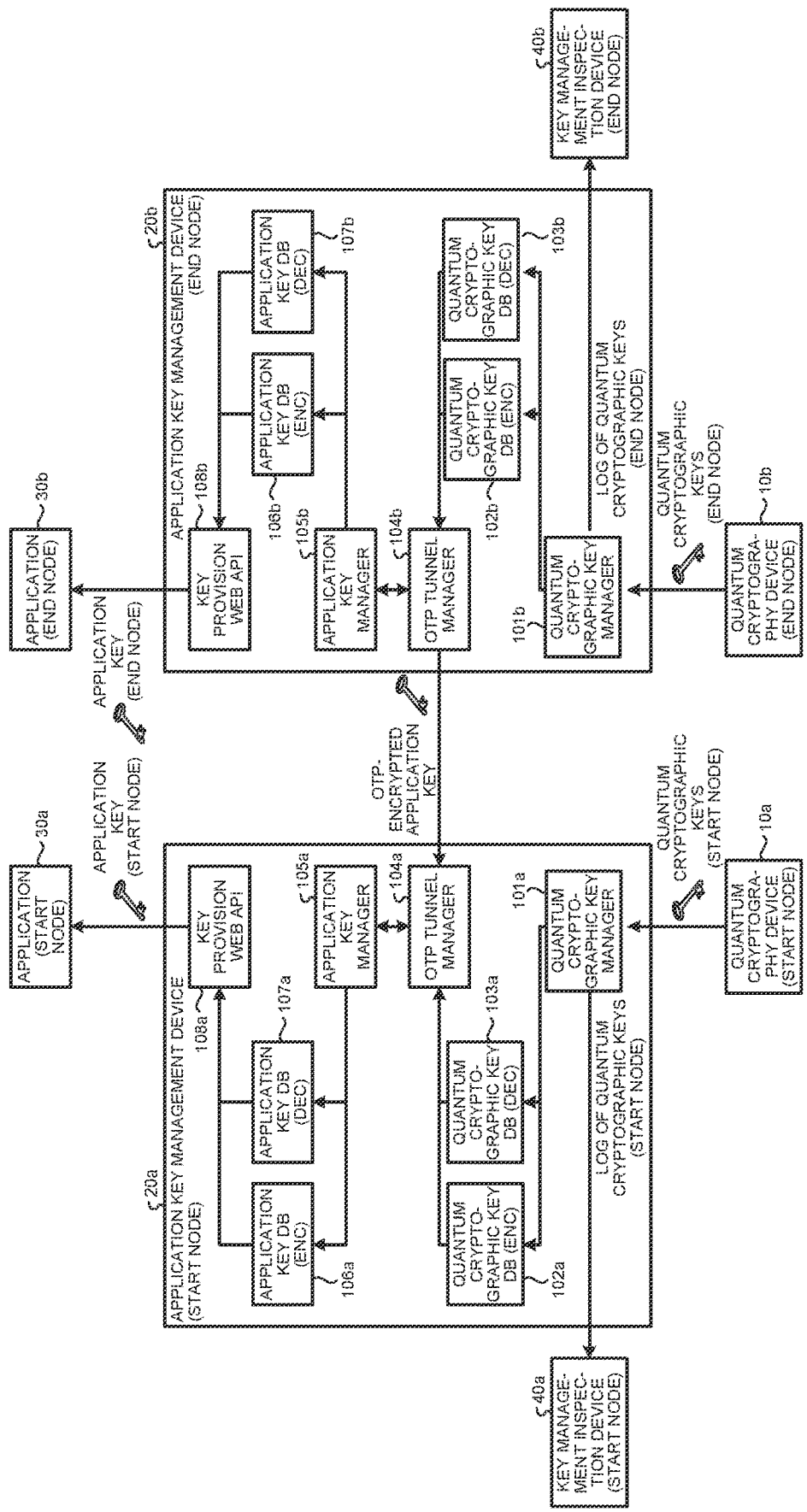
FIG. 3 is a diagram illustrating an exemplary configuration of an application key management device according to the first embodiment.

FIG. 3 is a diagram illustrating an exemplary configuration of the application key management device 20 according to the first embodiment. The application key management device 20*a* according to the first embodiment includes a quantum cryptographic key manager 101*a*, a quantum cryptographic key DB (ENC) 102*a*, a quantum cryptographic key DB (DEC) 103*a*, an OTP tunnel manager 104*a*, an application key manager 105*a*, an application key DB (ENC) 106*a*, an application key DB (DEC) 107*a*, and a key provision Web API 108*a*.

In an identical manner, the application key management device 20*b* according to the first embodiment includes a quantum cryptographic key manager 101*b*, a quantum cryptographic key DB (ENC) 102*b*, a quantum cryptographic key DB (DEC) 103*b*, an OTP tunnel manager 104*b*, an application key manager 105*b*, an application key DB (ENC) 106*b*, an application key DB (DEC) 107*b*, and a key provision Web API 108*b*.

The application key management devices 20*a* and 20*b* perform identical operations. Hence, the following explanation is given with reference to the application key management device 20*a* present on the side of the start node (the site A).

A quantum cryptographic key manager 101 receives a quantum cryptographic key from the quantum cryptography device 10*a* and archives the quantum cryptographic key in the quantum cryptographic key DR (ENC) 102*a* and the quantum cryptographic key DR (DEC) 103*a*. At that time, the quantum cryptographic key manager 101*a* sends a log of quantum cryptographic keys to the key management inspection device 40*a*.

The quantum cryptographic key DR (ENC) 102*a* is a database for storing the quantum cryptographic keys used in the encryption of application keys. The quantum cryptographic key DR (DEC) 103*a* is a database for storing the quantum cryptographic keys used in the decryption of encrypted application keys.

As explained earlier, an application key is shared after being subjected to OTP-encryption in which a quantum cryptographic key is used. In the case of performing OTP encryption with respect to an application key and sending the OTP-encrypted application key from a start node to an end node, the OTP encryption is performed using a quantum cryptographic key stored in the quantum cryptographic key DR (ENC) 102*a* in the start node, and the OTP decryption is performed using a quantum cryptographic key stored in the Quantum cryptographic key DR (DEC) 103*a* in the end node.

When an application key is received from an application key manager 105*a*, the OTP tunnel manager 104*a* performs OTP encryption using a quantum cryptographic key stored in the quantum cryptographic key DR (ENC) 102*a* and sends the OTP-encrypted application key to the sharing-destination node (with reference to FIG. 3, to the application key management device 20*b* at the site B). Conversely, when an OTP-encrypted application key is sent from the sharing-destination node, the OTP tunnel manager 104*a* performs OTP decryption using a quantum cryptographic key stored in the quantum cryptographic key DR (DEC) 103*a*, and sends the application key to the application key manager 105*a*.

The application key manager 105*a* generates an application key using a random number generator, archives the application key in the application key DB (ENC) 106*a* and at the same time sends it to the PTP tunnel manager 104*a*.

Moreover, the application key manager 105*a* archives, in the application key DB (DEC) 107*a*, the application key sent from the sharing-destination node.

The key provision Web API 108*a* sends an application key to the application 30*a* in response to a request for an application key from the application 30*a*.

Given below is the explanation of a configuration of the key management inspection device 40.

Figure 4:
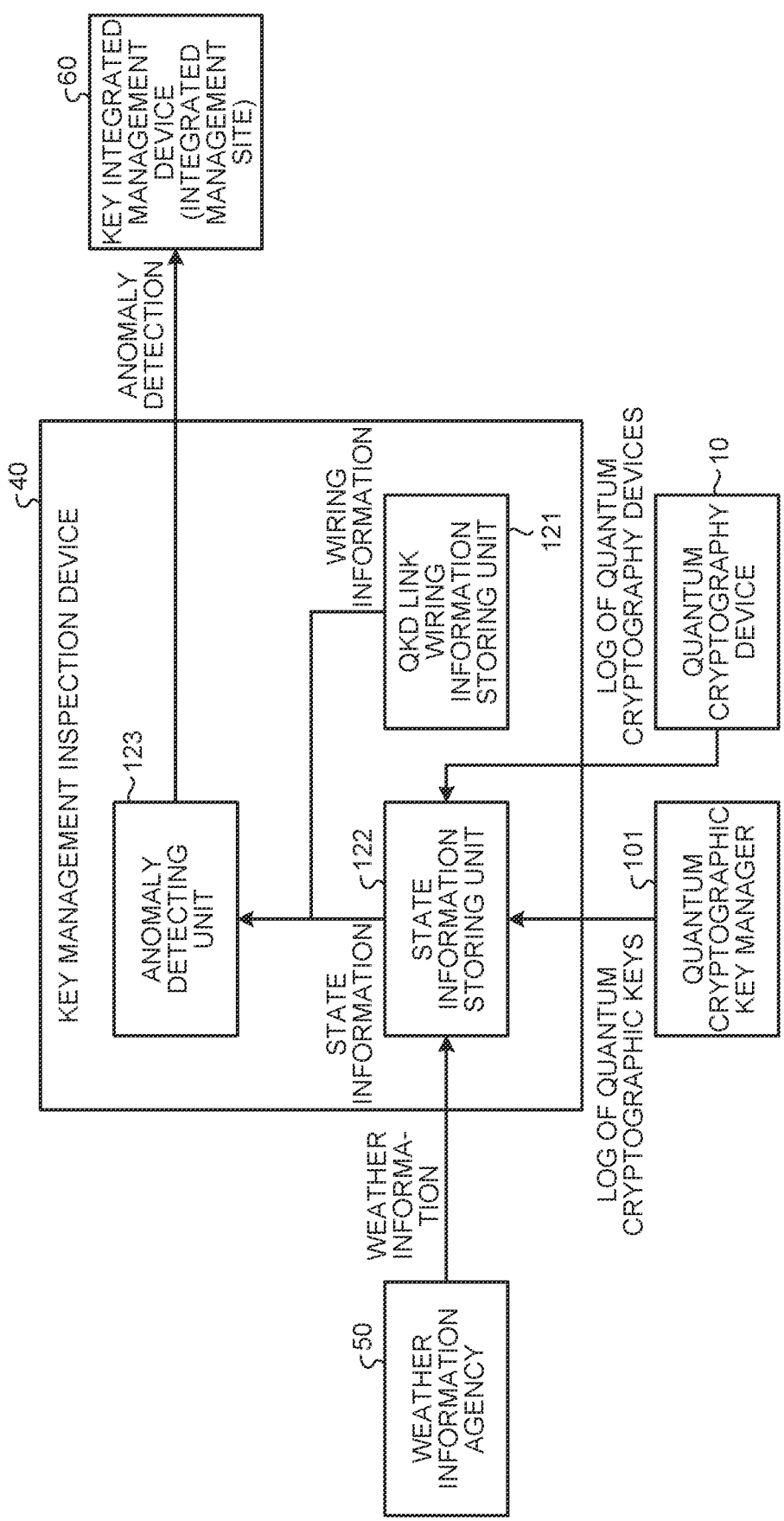
FIG. 4 is a diagram illustrating an exemplary configuration of a key management inspection device according to the first embodiment.

FIG. 4 is a diagram illustrating an exemplary configuration of the key management inspection device 40 according to the first embodiment. The key management inspection device 40 according to the first embodiment includes a QKD link wiring information storing unit 121, a state information storing unit 122, and an anomaly detecting unit 123.

The QKD link wiring information storing unit 121 is used to store the link information of QKD links; and, every time the anomaly detecting unit 123 performs anomaly inspection of a quantum cryptographic key, sends the wiring information to the anomaly detecting unit 123.

As far as the wiring information of a QKD link is concerned, for example, the following three types of information can be considered: the distance of the QKD link, the propagation loss of the optical fiber (i.e., an optical fiber cable: a bundle of optical fibers) of the QKD link, and Che wiring state of the QKD link.

The distance of the QKD link represents the length of the optical fiber laid between nodes. In the first embodiment, the distance of the QKD link implies the length of the optical fiber connected from the quantum cryptography device (start node) 10*a* to the quantum cryptography device (end node) 10*b*.

The propagation loss of the optical fiber of the QKD link represents the propagation loss per unit km (db/km) of the optical fiber of the QKD link. In the first embodiment, the propagation loss of the optical fiber of the QKD link represents the propagation loss per unit km of the optical fiber connected from the quantum cryptography device (start node) 10*a* to the quantum cryptography device (end node) 10*b*. Meanwhile, the propagation loss of the entire optical fiber of the QKD link is obtained as follows: (the distance of the QKD link)×(the propagation loss per unit km of the optical fiber of the QKD link).

Given below is the explanation about the wiring state of the QKD link. Firstly, as far as the wiring technique of the QKD link is concerned, it is possible to think of two techniques, namely, the overhead wiring technique and the underground technique. In the overhead wiring technique, the optical fiber is lad while suspending it on utility poles. The overhead wiring technique is susceptible to the effect of disturbances particularly attributed to wind and rainfall. On the other hand, in the underground technique, the optical fiber is laid underground, because of which there is less impact of the disturbances attributed to wind and rainfall. The wiring state of the QKD link is expressed as the ratio of the overhead wiring technique to the underground technique of the optical fiber laid between nodes. In the first embodiment, the wiring state of the QKD link represents the ratio of the overhead wiring technique to the underground technique of the optical fiber connected from the quantum cryptography device (start node) 10*a* to the quantum cryptography device (end node) 10*b*.

The state information storing unit 122 receives the log of quantum cryptographic keys from the quantum cryptographic key manager 101, receives the log of the quantum cryptography devices 10 from the quantum cryptography devices 10, and receives the weather information from the weather information agency 50; and the received information is recorded therein as an operation log. Every time the anomaly detecting unit 123 performs anomaly inspection of a quantum cryptographic key, the state information storing unit 122 sends the recorded operation log as the state information to the anomaly detecting unit 123.

In the log of quantum cryptographic keys and the log of the quantum cryptography devices 10, the information equivalent to quantum cryptography device information is written.

As far as the log of quantum cryptographic keys is concerned, the generation speeds of the quantum cryptographic keys at the concerned timing can be treated as an information item. As far as the log of the quantum cryptography devices 10 is concerned, the QbER (Quantum Bit Error Rate) and the parameters of optical devices used in the quantum cryptography devices 10 can be used. Among the quantum cryptography devices 10, individual variability and aging deterioration develops in regard to the optical system. Thus, by taking into account the optical system parameters, it becomes possible to hold down a decline in the anomaly detection accuracy attributed to individual variability and aging deterioration. The possible optical devices are as mentioned in Patent Literature 1, and examples thereof include a polarization regulator, a fiber stretcher, and an optical detector.

As far as the weather information is concerned, for example, the ambient temperature, the wind force (the wind speed), and the amount of rainfall can be used. As mentioned in Non Patent Literature 1, since quantum cryptographic communication is sensitive to the environmental factors, it becomes necessary to collect the environmental factors such as the weather information. In the first embodiment, the ambient temperature, the wind force, and the amount of rainfall at the site A as well as the ambient temperature, the wind force, and the amount of rainfall at the site B can be used as the weather information. When the distance of the QKD link is long, the weather information of the intermediate sites through which the QKD link is laid can also be taken into account.

The anomaly detecting unit 123 receives the wiring information from the QKD link wiring information storing unit 121, and receives the state information from the state information storing unit 122. Then, from the wiring information and the state information, the anomaly detecting unit 123 inspects whether or not the quantum cryptographic communication system 100 has any anomaly. If any anomaly is detected in the quantum cryptographic communication system 100, then the anomaly detecting unit 123 notifies the key integrated management device 60 about the anomaly detection. This is haw the key management inspection device is configured.

Given below is the explanation of a configuration of the anomaly detecting unit 123.

Figure 5:
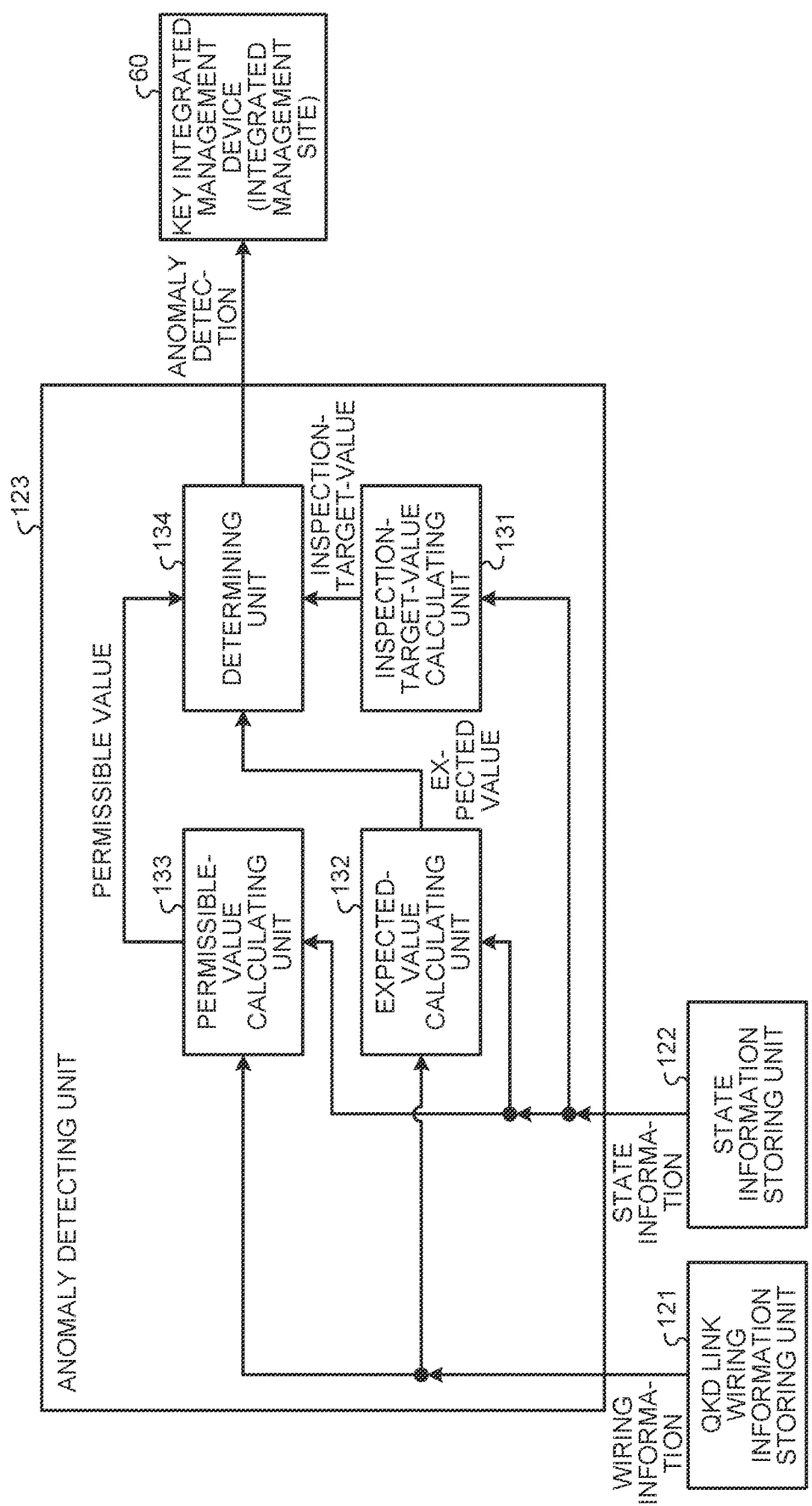
FIG. 5 is a diagram illustrating an exemplary configuration of an anomaly detecting unit according to the first embodiment.

FIG. 5 is a diagram illustrating an exemplary configuration of the anomaly detecting unit 123 according to the first embodiment. The anomaly detecting unit 123 according to the first embodiment includes an inspection-target-value calculating unit 131, an expected-value calculating unit 132, a permissible-value calculating unit 133, and a determining unit 134.

The inspection-target-value calculating unit 131 extracts the target data for inspection (such as the generation speeds of the quantum cryptographic keys) from the state information, and calculates an inspection target value from that data. Then, the inspection-target-value calculating unit 131 sends the inspection target value to the determining unit 134.

The expected-value calculating unit 132 calculates an expected value from the state information and the wiring information (such as the propagation loss of the optical fiber of the QKD link), and sends the expected value to the determining unit 134.

The permissible-value calculating unit 133 calculates a permissible value from the state information and the wiring information (such as the weather information and the wiring state indicating the ratio of the overhead wiring technique to the underground technique constituting the QKD link), and sends the permissible value to the determining unit 134.

The determining unit 134 refers to the expected value, the permissible value, and the inspection target value; and accordingly determines if the management of the quantum cryptographic keys is normal. If it is determined that the management has anomaly, then the determining unit 134 notifies the key integrated management device 60 about the anomaly detection.

Given below is the explanation of the calculation of the expected value, the calculation of the permissible value, and the calculation of anomaly detection determination for each inspection target value; and the explanation of the effects of the first embodiment. As far as the inspection target value is concerned, for example, it is possible to think of the following three values: the average value of the generation speeds of the quantum cryptographic keys, the dispersion value of the generation speeds of the quantum cryptographic keys, and the dispersion value of the QbERs.

(1) When the Average Value of the Generation Speeds of the Quantum Cryptographic Keys Represents the Inspection Target Value The inspection-target-value calculating unit 131 retrieves, from the quantum cryptography device information, the average value of the generation speeds of the quantum cryptographic keys during the inspection target period, and calculates the average speed (the average value of the generation speeds) as the inspection target value. If the average speed calculated by the inspection-target-value calculating unit 131 is within the range of (the expected value)±(the permissible value), then the determining unit 134 determines that the state is normal. On the other hand, if the average speed is outside the range of (the expected value)±(the permissible value), then the determining unit 134 determines that there is anomaly.

The expected-value calculating unit 132 obtains from, for example, the distance of the QKD link and the propagation loss of the optical fiber of the QKD link, the propagation loss of the entire optical fiber of the QKD link ((the distance of the QKD link)×(the propagation loss per unit km of the optical fiber of the QKD link)). Then, from the correspondence data of the propagation loss of the entire optical fiber of the QKD link and the generation speeds of the quantum cryptography devices 10, the expected-value calculating unit 132 obtains the expected value.

Figure 6:
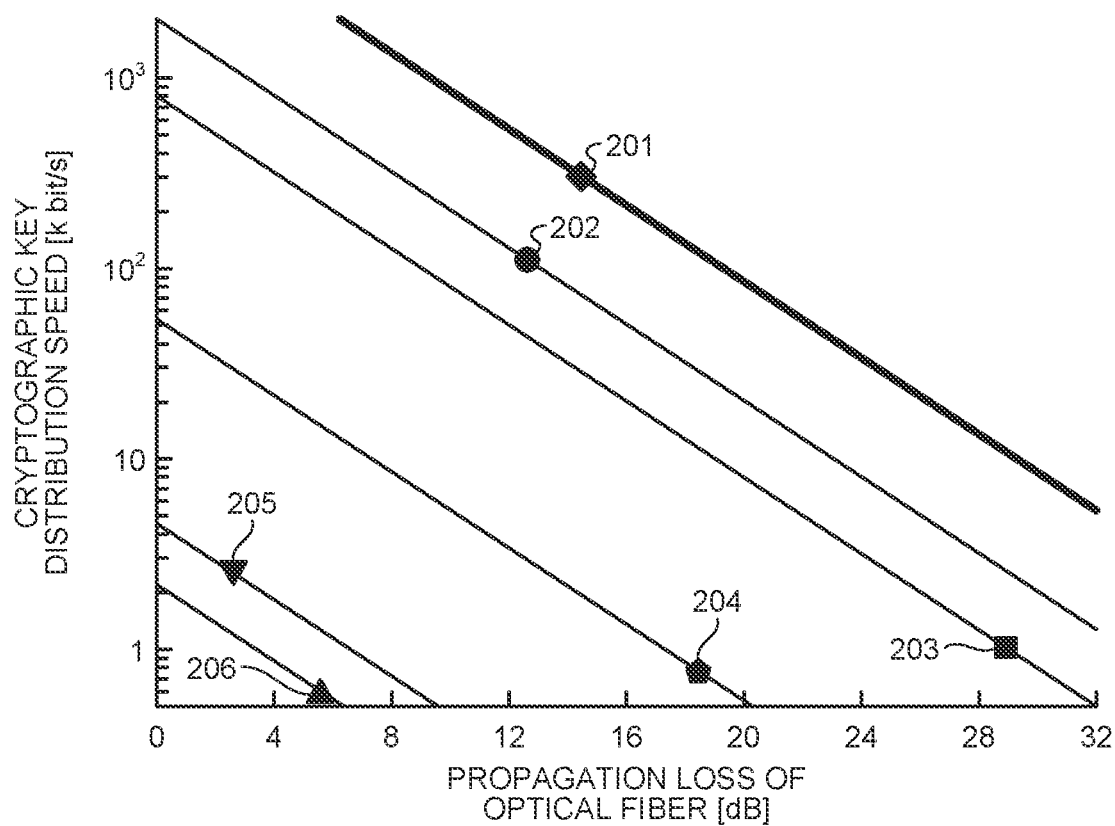
FIG. 6 is a diagram illustrating an example of the correspondence data of the propagation loss of an optical fiber and the generation speeds of quantum cryptographic keys in a quantum cryptography device.

FIG. 6 is a diagram illustrating an example of the correspondence data of the propagation loss of the optical fiber and the generation speeds of quantum cryptographic keys in the quantum cryptography device 10. In the example illustrated in FIG. 6, a graph 201 illustrates the case of the quantum cryptography device 10 according to the first embodiment. Moreover, graphs 202 to 206 illustrate the cases of other quantum cryptography devices (conventional quantum cryptography devices). As illustrated in the graphs 201 to 206, generally, the greater the propagation loss of the optical fiber, the cryptographic key distribution speed becomes slower.

For example, if there is a propagation loss of 8 dB in the entire optical fiber of the QKD link and if the quantum cryptography device 10 according to the first embodiment is used, then the generation speeds of the quantum cryptographic keys become equal to 1 Mbps, and thus the expected value is equal to 1 Mbps.

In case the quantum cryptography device 10 is taken away by an attacker and if the attacker installs it at a different site and saves quantum cryptographic keys in disguise, when the distance of the post-reinstallation QKD link differs from the distance of the pre-reinstallation QKD link, the generation speeds of the quantum cryptographic keys happen to be different in principle.

Thus, when the average value of the generation speeds of the quantum cryptographic keys is treated as the inspection target value, since the generation speeds of the quantum cryptographic keys are different than the generation speeds before reinstallation, it becomes possible to detect anomaly. Moreover, at the time of reinstallation, since the attacker needs to ensure that the distance of the QKD link is same as before reinstallation, it becomes possible to impose restrictions on the reinstallation sites.

Returning to the explanation with reference to FIG. 5, in the permissible-value calculating unit 133, the permissible value is calculated from the wiring state of the QKD link (the ratio of the overhead wiring technique to the underground technique) and the weather information (for example, wind and rainfall). Regarding the overhead wiring state of the QKD link, as explained earlier, the greater the proportion of the overhead wiring technique, the variation attributed to the environment factors becomes greater. Thus, for example, the greater the wind speed or the greater the amount of rainfall, the environmental factor variation becomes greater and the variation in the generation speeds of the quantum cryptographic keys becomes greater.

The permissible-value calculating unit 133 calculates the permissible value from the wiring state and the weather information. For example, the permissible-value calculating unit 133 sets the permissible value to be large in proportion to the proportion of the overhead wiring technique. In other words, the smaller the proportion of the overhead wiring technique, the generation speeds of the quantum cryptographic keys become more stable, and thus the permissible-value calculating unit 133 sets a smaller permissible value.

Moreover, for example, the permissible-value calculating unit 133 sets the permissible value to be large in proportion to the wind speed (wind force). In other words, slower the wind speed, the more stable becomes the generation speeds of the quantum cryptographic keys, and thus the permissible-value calculating unit 133 sets a smaller permissible value.

Furthermore, for example, the permissible-value calculating unit 133 sets the permissible value to be large in proportion to the proportion of the overhead wiring technique and in proportion to the wind force.

Moreover, for example, the larger the amount of rainfall, the permissible value is set larger by the permissible-value calculating unit 133. In other words, smaller the amount of rainfall, the generation speeds of the quantum cryptographic keys become more stable, and thus the permissible-value calculating unit 133 sets a smaller permissible value.

Furthermore, for example, the permissible-value calculating unit 133 sets the permissible value to be large in proportion to the proportion of the overhead wiring technique and in proportion to the amount of rainfall.

Meanwhile, if the permissible value is not set; then, depending on the wiring state of the optical fiber, in the situation in which there is a large variation attributed to the environmental factors, anomaly gets detected in a false way. Hence, as a result of setting a permissible value, it becomes possible to reduce the frequency of false anomaly detection.

Till now, the explanation was given about the basic calculation method in regard to (1) according to the first embodiment. However, depending on the situation, individual variability and aging deterioration among the quantum cryptography devices 10 can be handled by calculating the expected value and the permissible value by taking into account the parameters of the polarization regulator, the fiber stretcher, and the optical detector used in each quantum cryptography device 10.

(2) When the Dispersion Value of the Generation Speeds of the Quantum Cryptographic Keys Represents the Inspection Target Value The inspection-target-value calculating unit 131 retrieves, from the quantum cryptography device information, the generation speeds of the quantum cryptographic keys during the inspection target period, and calculates the dispersion value of the generation speeds as the inspection target value. If the dispersion value calculated by the inspection-target-value calculating unit 131 is within the range of (the expected value)±(the permissible value), then the determining unit 134 determines that the state is normal. On the other hand, if the dispersion value is outside the range of (the expected value)±(the permissible value), then the determining unit 134 determines that there is anomaly.

The expected-value calculating unit 132 calculates the expected value from, for example, the wiring state of the QKD link (the ratio of the overhead wiring technique to the underground technique of the optical fiber laid between nodes) and the weather information (for example, the wind force and the amount of rainfall).

Regarding the wiring state of the QKD link, as explained earlier, the greater the proportion of the overhead wiring technique, the variation attributed to the environment factors is greater. Thus, for example, the greater the wind speed or the greater the amount of rainfall, the environmental factor variation becomes greater and the variation in the generation speeds of the quantum cryptographic keys becomes greater. Thus, the expected-value calculating unit 132 sets the expected value in proportion to the variation in the generation speeds of the quantum cryptographic keys. For example, if the proportion of the overhead wiring technique is greater than a threshold value, then the expected-value calculating unit 132 sets the expected value to be large in proportion to the wind force (or the amount of rainfall).

In case the quantum cryptography device 10 is taken away by an attacker and if the attacker installs it at a different site and saves quantum cryptographic keys in disguise, when the wiring state of the post-reinstallation QKD link differs from the wiring state of the pre-reinstallation QKD link, the dispersion value of the generation speeds differ due to the magnitude of the variation attributed to the environment factors such as the wind speed and the amount of rainfall. Thus, when the dispersion value of the generation speeds of the quantum cryptographic keys is treated as the inspection target value, it becomes possible to detect anomaly.

In the same manner as the expected-value calculating unit 132, the permissible-value calculating unit 133 calculates the permissible value from the wiring state of the QKD link (the ratio of the overhead wiring technique to the underground technique of the optical fiber laid between nodes) and the weather information (for example, the wind force and the amount of rainfall). Then, in an identical manner to the case of the expected value, regarding the wiring state of the QKD link, the permissible-value calculating unit 133 sets the permissible value to be large in proportion to the proportion of the overhead wiring technique. Moreover, regarding the weather state, for example, the permissible-value calculating unit 133 sets the permissible value to be large in proportion to the wind speed or the amount of rainfall. For example, the permissible-value calculating unit 133 sets the permissible value to be large in proportion to the proportion of the overhead wiring technique and in proportion to the wind force (or greater the amount of rainfall).

Herein, if the variation attributed to the environmental factors is high, the dispersion value is also subject to variation. Hence, as a result of setting a permissible value, it becomes possible to reduce the frequency of false anomaly detection.

Till now, the explanation was given about the basic calculation method in regard to according to the first embodiment. However, depending on the situation, individual variability and aging deterioration among the quantum cryptography devices 10 can be handled by calculating the expected value and the permissible value by taking into account the parameters of the polarization regulator, the fiber stretcher, and the optical detector used in each quantum cryptography device 10.

(3) When the Dispersion Value of the QbERs Represents the Inspection Target Value The inspection-target-value calculating unit 131 retrieves, from the quantum cryptography device information, the QbER during the inspection target period, and calculates the dispersion value of the QbERs. If the dispersion value calculated by the inspection-target-value calculating unit 131 is within the range of (the expected value)±(the permissible value), then the determining unit 134 determines that the state is normal. On the other hand, if the dispersion value is outside the range of (the expected value)±(the permissible value), then the determining unit 134 determines that there is anomaly.

The expected-value calculating unit 132 calculates the expected value from, for example, the wiring state of the QKD link (the ratio of the overhead wiring technique to the underground technique of the optical fiber laid between nodes) and the weather information (for example, the wind force and the amount of rainfall).

Regarding the wiring state of the QKD link, as explained earlier, the greater the proportion of the overhead wiring technique, the variation attributed to the environment factors is greater. Moreover, regarding the weather state, for example, the greater the wind speed (the wind force) or the greater the amount of rainfall, the environmental factor variation is greater and the QbER variation is greater. Thus, the expected-value calculating unit 132 sets the expected value to be large in proportion to the variation in the QbER. For example, the expected-value calculating unit 132 sets the expected value to be large in proportion to the proportion of the overhead wiring technique and in proportion to the wind force (or the amount of rainfall).

In case the quantum cryptography device 10 is taken away by an attacker and if the attacker installs it at a different site and saves quantum cryptographic keys in disguise, when the wiring state of the post-reinstallation QKD link differs from the wiring state of the pre-reinstallation QKD link, the dispersion of the QbER differs due to the difference in the magnitude of the environmental factor variation such as the wind speed or the amount of rainfall. Thus, when the dispersion value of the QbERs is treated as the inspection target value, it becomes possible to detect anomaly.

In the same manner as the expected-value calculating unit 132, the permissible-value calculating unit 133 calculates the permissible value from the wiring state of the QKD link (the ratio of the overhead wiring technique to the underground technique of the optical fiber laid between nodes) and the weather information (for example, the wind force and the amount of rainfall). Then, in an identical manner to the case of the expected value, regarding the wiring state of the QKD link, the permissible-value calculating unit 133 sets the permissible value to be large in proportion to the proportion of the overhead wiring technique. Moreover, regarding the weather state, for example, the permissible-value calculating unit 133 sets the permissible value to be large in proportion to the wind speed or the amount of rainfall. For example, the permissible-value calculating unit 133 sets the permissible value to be large in proportion to the proportion of the overhead wiring technique and in proportion to the wind force (or the amount of rainfall).

Moreover, the greater the variation attributed to the environmental factors, the dispersion value becomes more varying. Hence, as a result of setting a permissible value, it becomes possible to reduce false anomaly detections.

Till now, the explanation was given about the basic calculation method in regard to (3) according to the first embodiment. However, depending on the situation, individual variability and aging deterioration among the quantum cryptography devices 10 can be handled by calculating the expected value and the permissible value by taking into account the parameters of the polarization regulator, the fiber stretcher, and the optical detector used in each quantum cryptography device 10.

Meanwhile, at the time of performing anomaly detection, the determining unit 134 can select either one or more than one of (1) to (3) explained above.

In the first embodiment, the key management inspection device 40 and the anomaly detecting unit 123 have the same configuration in the quantum cryptography device 10*a* (the start node) and in the quantum cryptography device 10*b* (the end node). Thus, the explanation above is given without differentiating between the start node and the end node.

Example of Key Management Inspection Method

Figure 7:
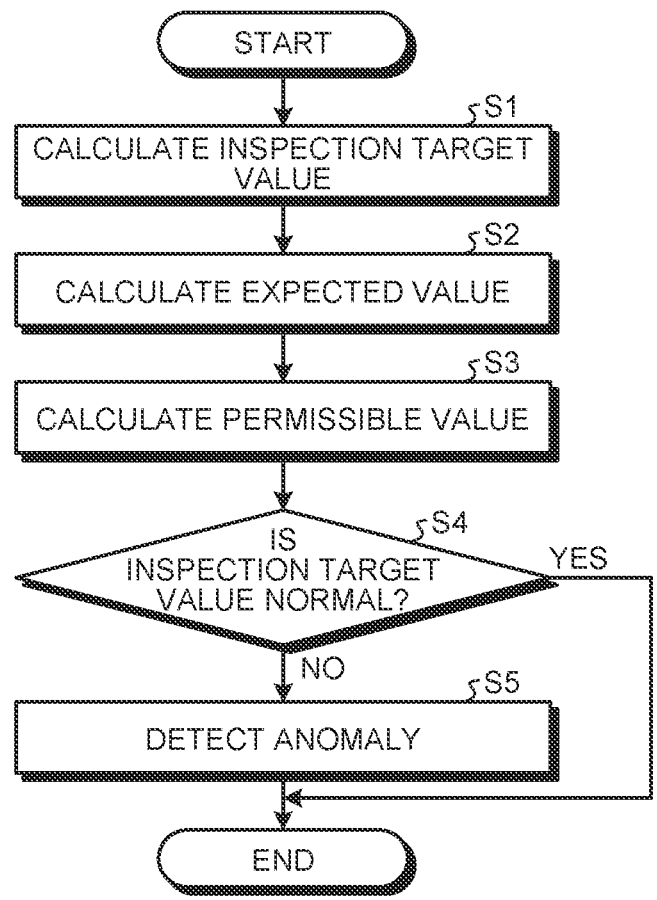
FIG. 7 is a flowchart for explaining an example of a key management inspection method according to the first embodiment.

FIG. 7 is a flowchart for explaining an example of the key management inspection method according to the first embodiment. Firstly, the inspection-target-value calculating unit 131 calculates the inspection target value based on the quantum cryptography device information (for example, the generation speeds of the quantum cryptographic keys) (Step S1).

Then, the expected-value calculating unit 132 calculates the expected value based on at least either one of the following: the wiring information of the QKD link connected to the quantum cryptography device 10 to be inspected; the weather information of the site installed with the quantum cryptography device 10 to be inspected; and the quantum cryptography device information (Step S2).

Subsequently, the permissible-value calculating unit 133 calculates the permissible value based on at least one of the following: the wiring information, the weather information, and the quantum cryptography device information (Step S3).

Then, the determining unit 134 determines whether or not the inspection target value is normal (Step S4). More particularly, the determining unit 134 determines whether or not the inspection target value is within the range of (the expected value)−(the permissible value) and within the range of (the expected value)+(the permissible value).

If the inspection target value is not normal (No at Step S4), that is, if the inspection target value is outside the range of (the expected value)−(the permissible value) and outside the range of (the expected value)+(the permissible value), then the determining unit 134 transmits the anomaly detection to the key integrated management device 60 (Step S5). On the other hand, if the inspection target value is normal. (Yes at Step S4), then the operations end.

As explained above, in the first embodiment, the quantum cryptographic communication system 100 includes the key integrated management device 60, a plurality of quantum cryptography devices 10, and a plurality of key management inspection devices 40. Each key management inspection device 40 inspects the quantum cryptographic keys generated by one of the quantum cryptography devices 10. Each key management inspection device 40 includes the inspection-target-value calculating unit 131, the expected-value calculating unit 132, the permissible-value calculating unit 133, and the determining unit 134. The inspection-target-value calculating unit 131 calculates the inspection target value based on the quantum cryptography device information regarding the corresponding quantum cryptography device 10. The expected-value calculating unit 132 calculates the expected value based on at least one of the following: the wiring information of the QKD link connected to the quantum cryptography device 10 to be inspected, the weather information of the site installed with the quantum cryptography device 10 to be inspected, and the quantum cryptography device information. The permissible value calculating unit 133 calculates the permissible value based on at least one of the following: the wiring information, the weather information, and the quantum cryptography device information. The determining unit 134 determines whether or not the inspection target value is within the range of (the expected value)−(the permissible value) and within the range of (the expected value)+(the permissible value). If the inspection target value is outside the range of (the expected value)−(the permissible value)) and outside the range of (the expected value)+(the permissible value), then the determining unit 134 notifies the key integrated management device 60 about the anomaly detection.

As a result, in the quantum cryptographic communication system 100 according to the first embodiment, anomaly detection in the Quantum cryptographic communication system can be performed with more accuracy.

Given below is the explanation of a second embodiment. In the explanation of the second embodiment, the identical explanation to the first embodiment is not given again, and only the differences with the first embodiment are explained. In the second embodiment, the explanation is given about the case of performing anomaly detection performed at an integrated management site.

Figure 8:
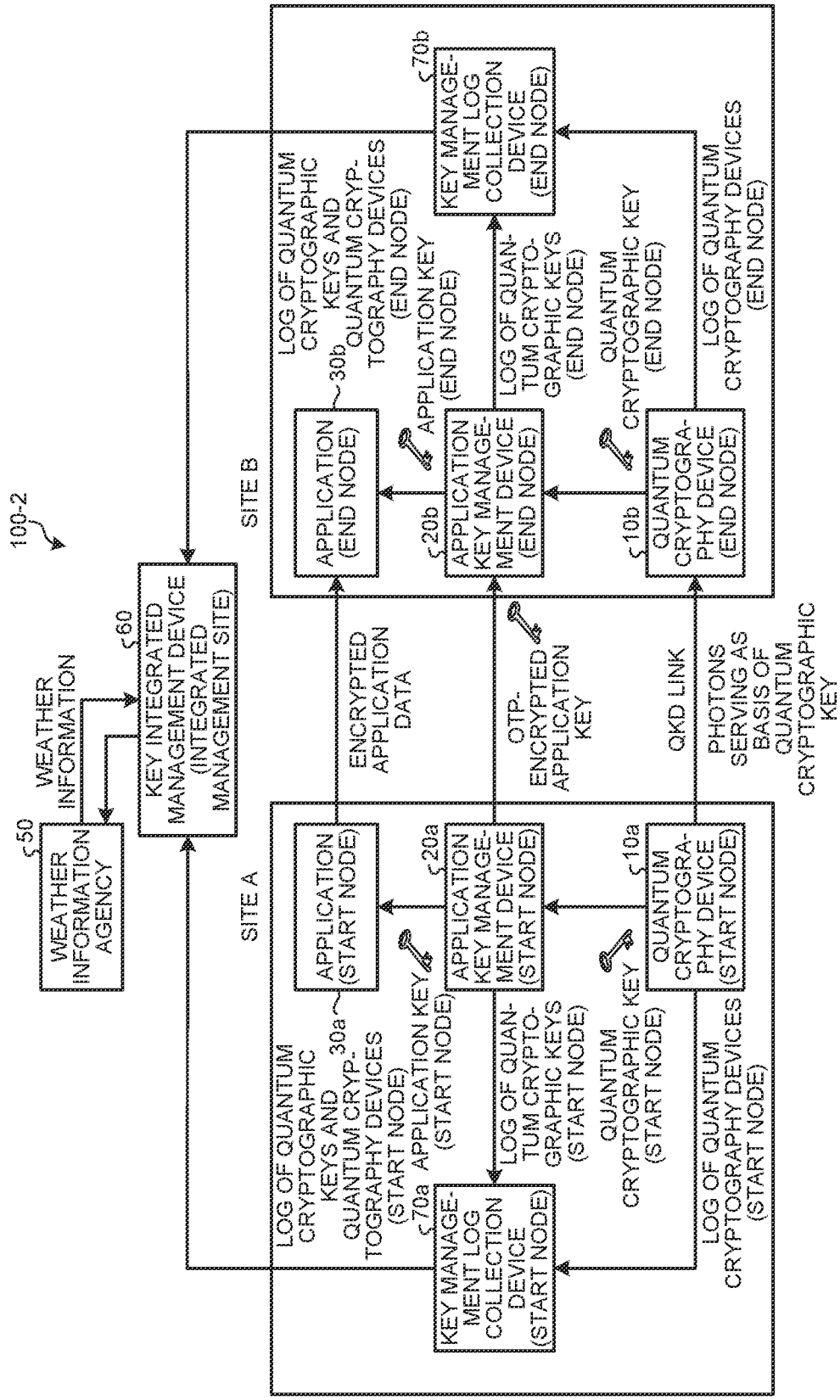
FIG. 8 is a diagram illustrating an exemplary configuration of a Quantum cryptographic communication system according to a second embodiment.

FIG. 8 is a diagram illustrating an exemplary configuration of a quantum cryptographic communication system 100-2 according to the second embodiment. The quantum cryptography devices 10, the application key management devices 20, and the applications 30 have the same configurations as in the first embodiment. Hence, that explanation is not given again.

In the second embodiment, a key management log collection device 70*a* is added at the site A, and a key management log collection device 70*b* is added at the site B.

Each key management log collection device 70 receives a log of quantum cryptographic keys from the corresponding application key management device 20 and receives a log of quantum cryptography devices from the corresponding quantum cryptography device 10. The contents of the log of quantum cryptographic keys and the contents of the log of quantum cryptography devices are identical to the first embodiment.

Each key management log collection device 70 sends the log of quantum cryptographic keys and the log of quantum cryptography devices to the key integrated management device 60 representing the integrated management site.

The key integrated management device 60 receives the log of quantum cryptographic keys and the log of quantum cryptography devices from the key management log collection device 70 installed at each site; receives the weather information from the weather information agency; and inspects each node (quantum cryptography device 10). When any anomaly is detected, the key integrated management device 60 issues an anomaly notification to the nodes.

Given below is the explanation of a configuration of the key integrated management device 60 according to the second embodiment.

Figure 9:
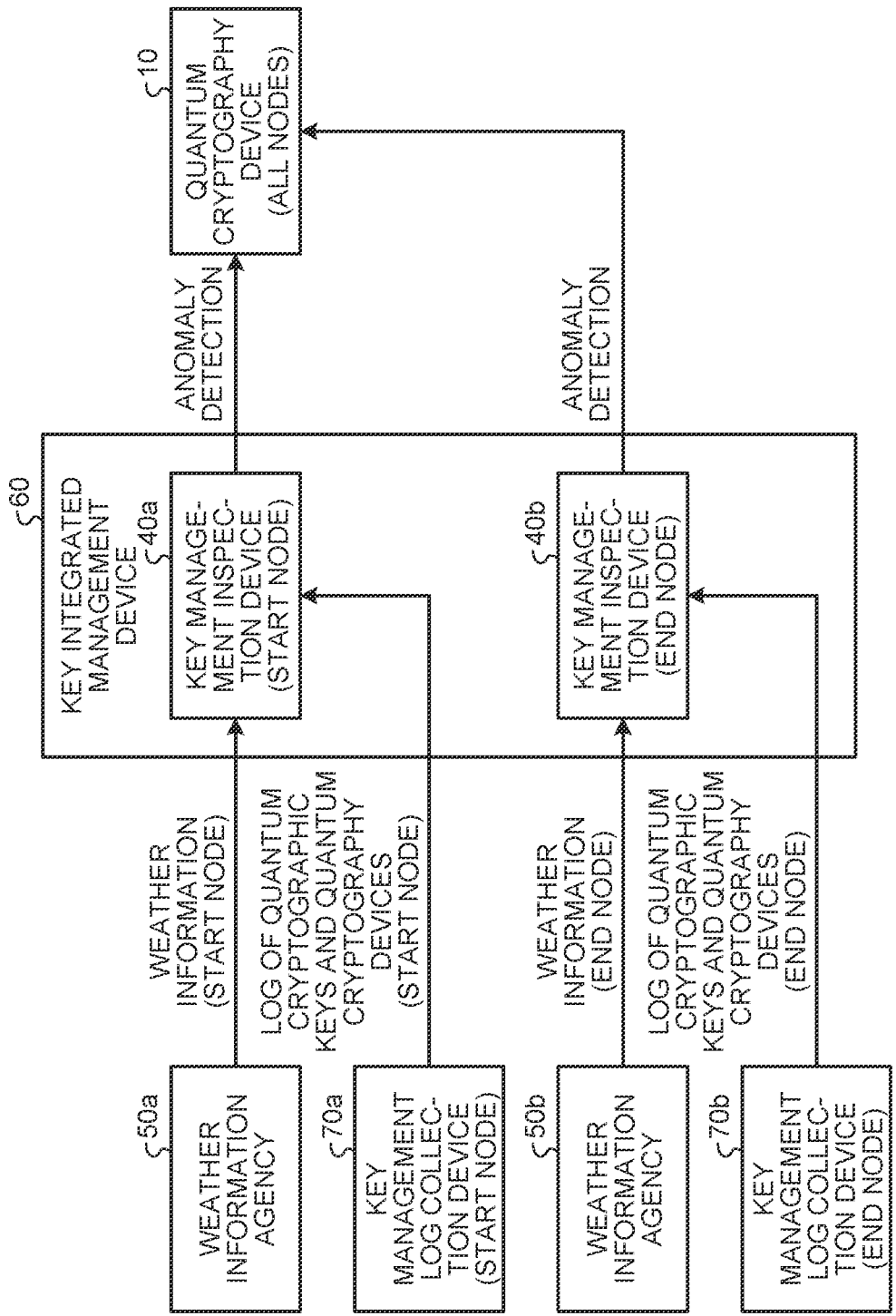
FIG. 9 is a diagram illustrating an exemplary configuration of a key integrated management device according to the second embodiment.

FIG. 9 is a diagram illustrating an exemplary configuration of the key integrated management device 60 according to the second embodiment. The key integrated management device 60 according to the second embodiment includes a key management inspection device 40*a* (the start node) and a key management inspection device 40*b* (the end node).

The key management inspection device 40*a* receives the weather information regarding the start node from the weather information agency 50*a*; receives the log of quantum cryptographic keys and the log of quantum cryptography devices from the key management log collection device 70*a* of the start node; and inspects the start node (the quantum cryptography device 10*a*). When any anomaly is detected, the key management inspection device 40*a* notifies all nodes (in the second embodiment, the quantum cryptography devices 10*a* and 10*b*) about the anomaly detection.

In an identical manner, the key management inspection device 40*b* receives the weather information regarding the end node from the weather information agency 50*b*; receives the log of quantum cryptographic keys and the log of quantum cryptography devices from the key management log collection device 70*b* of the end node; and inspects the end node (the Quantum cryptography device 10*b*). When any anomaly is detected, the key management inspection device 40*b* notifies all nodes (in the second embodiment, the quantum cryptography devices 10*a* and 10*b*) about the anomaly detection.

Given below is the explanation of a configuration of the key management inspection device 40 according to the second embodiment.

Figure 10:
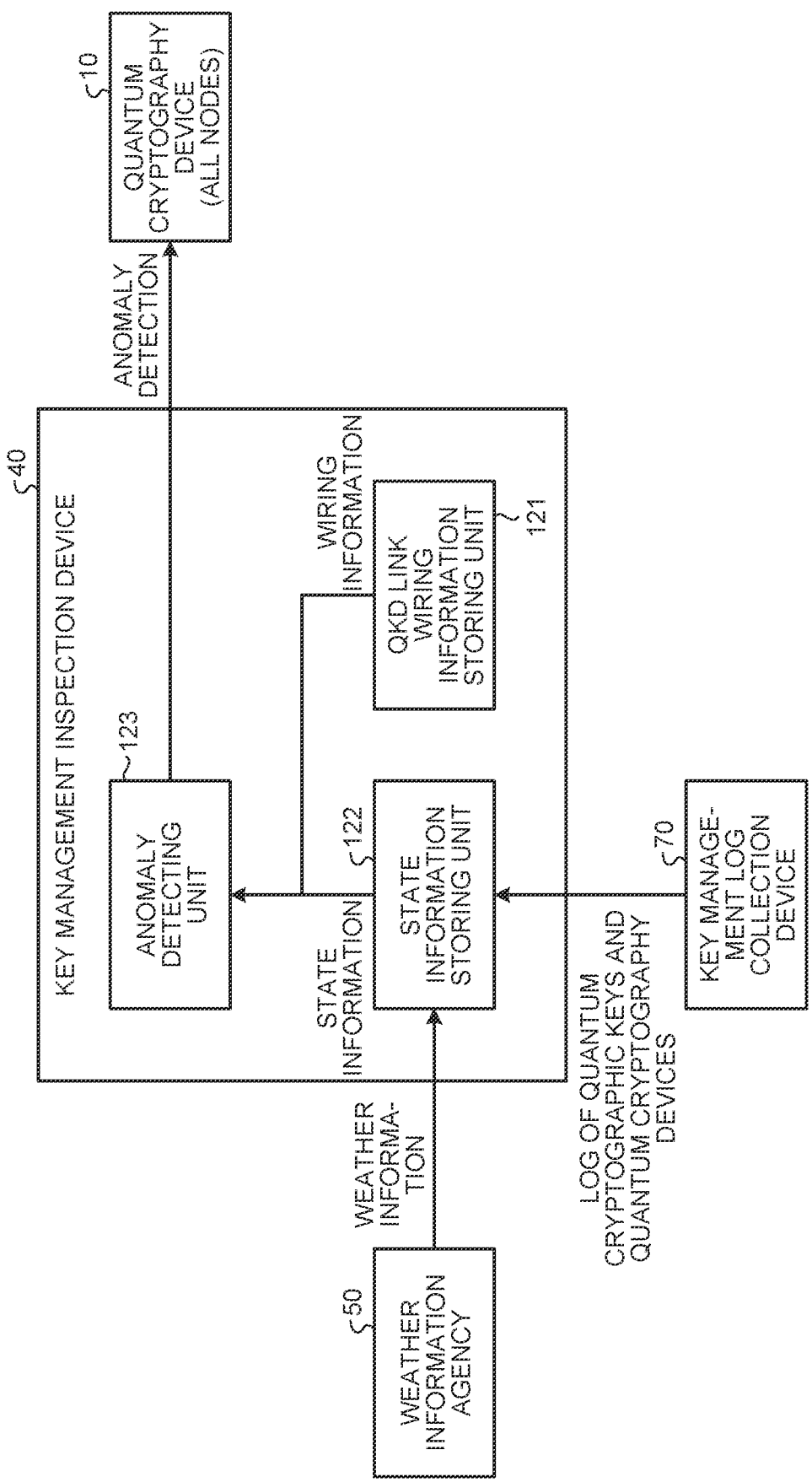
FIG. 10 is a diagram illustrating an exemplary configuration of the key management inspection device according to the second embodiment.

FIG. 10 is a diagram illustrating an exemplary configuration of the key management inspection device 40 according to the second embodiment. The key management inspection device 40 according to the second embodiment has the same basic configuration as in the first embodiment. Thus, the key management inspection device 40 according to the second embodiment includes the QKD link wiring information storing unit 121, the state information storing unit 122, and the anomaly detecting unit 123.

The QKD link wiring information storing unit 121 is used to store the wiring information of the QKD link connected to the quantum cryptography device 10 to be inspected. The state information storing unit 122 receives the log of quantum cryptographic keys and the log of quantum cryptography devices from the corresponding key management log collection device 70; receives the weather information from the corresponding weather information agency 50; and the received information is stored therein as state information.

The wiring information and the state information has the same configuration as in the first embodiment.

The anomaly detecting unit 123 obtains the wiring information from the QKD link wiring information storing unit 121, obtains the state information from the state information storing unit 122, and performs an anomaly detection operation. When any anomaly is detected, the anomaly detecting unit 123 notifies all nodes (the quantum cryptography devices 10) about the anomaly detection. The anomaly detecting unit 123 has the same configuration and implements the same calculation method as in the first embodiment. Hence, that explanation is not given again.

Meanwhile, in the second embodiment, it is explained that all nodes are notified about anomaly detection. However, there can be a situation in which only some of the nodes can be notified. For example, in the example illustrated in FIG. 8, if any anomaly is detected in a quantum cryptographic key generated by the quantum cryptography device 10a, either only the quantum cryptography device 10a in which the anomaly is detected can be notified about the anomaly detection, or only the other quantum cryptography device 10b can be notified about the anomaly detection.

Lastly, the explanation is given about an exemplary hardware configuration of the quantum cryptography devices 10, the application key management devices 20, the key management inspection devices 40, the key integrated management device 60 according to the first and second embodiments as well as an exemplary hardware configuration of the key management log collection devices 70 according to the second embodiment.

Exemplary Hardware Configuration

Figure 11:
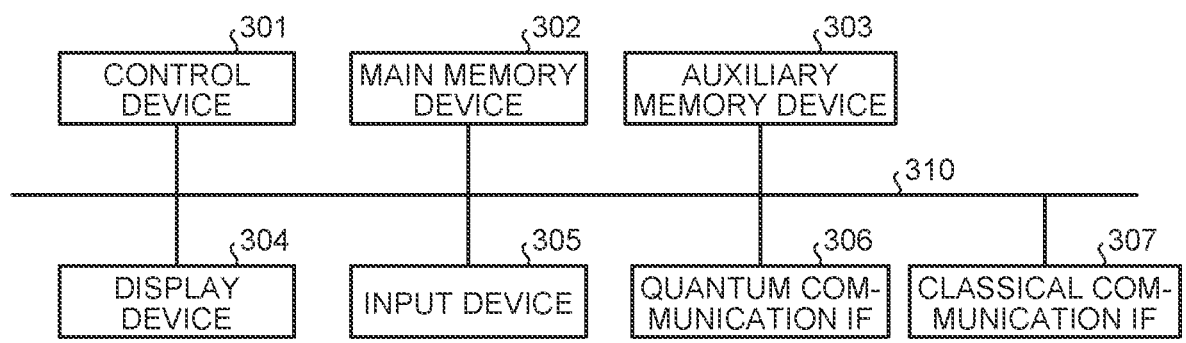
FIG. 11 is a diagram illustrating an exemplary hardware configuration of the main constituent elements of the quantum cryptography devices according to the first and second embodiments.

FIG. 11 is a diagram illustrating an exemplary hardware configuration of the main constituent elements of the quantum cryptography devices 10 according to the first and second embodiments. The quantum cryptography device 10 according to the first and second embodiments includes a control device 301, a main memory device 302, an auxiliary memory device 303, a display device 304, an input device 305, a quantum communication interface (IF) 306, and a classical communication IF 307.

The control device 301, the main memory device 302, the auxiliary memory device 303, the display device 304, the input device 305, the quantum communication interface (IF) 306, and the classical communication IF 307 are connected to each other via a bus 310.

The control device 301 executes computer programs that have been read from the auxiliary memory device 303 into the main memory device 302. The main memory device 302 is a memory such as a read only memory (ROM) or a random access memory (RAM). The auxiliary memory device 303 is a hard disk drive (HDD) or a memory card.

The display device 304 displays the state of the quantum cryptography device 10. The input device 305 receives a user The quantum communication IF 306 is an interface for establishing connection with a QKD link. The classical communication IF 307 is an interface for establishing connection with a transmission path.

Figure 12:
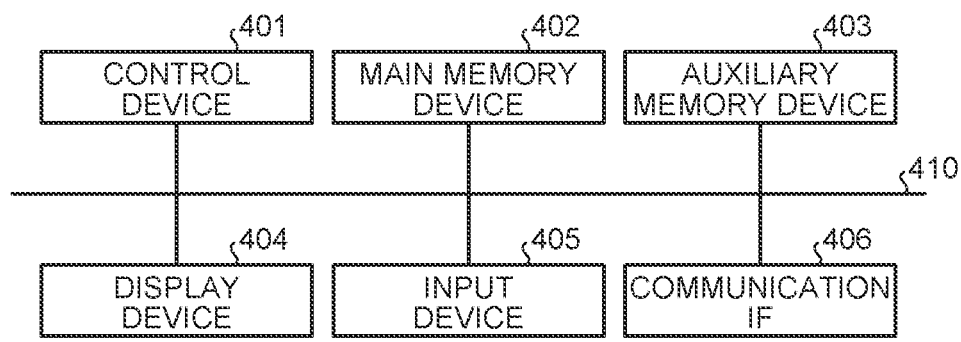
FIG. 12 is a diagram for explaining an exemplary hardware configuration of the main constituent elements of the application key management devices, the key management inspection devices, and the key integrated management device according to the first and second embodiments as well as a key management log collection device according to the second embodiment.

FIG. 12 is a diagram for explaining an exemplary hardware configuration of the main constituent elements of the application key management devices 20, the key management inspection devices 40, and the key integrated management device 60 according to the first and second embodiments as well as the key management log collection device 70 according to the second embodiment. Each of the application key management devices 20, the key management inspection devices 40, and the key integrated management device 60 according to the first and second embodiments as well as the key management log collection device 70 according to the second embodiment includes a control device 401, a main memory device 402, an auxiliary memory device 403, a display device 404, an input device 405, and a communication IF 406.

The control device 401, the main memory device 402, the auxiliary memory device 403, the display device 404, the input device 405, and the communication IF 406 are connected to each other via a bus 410.

The control device 401 executes computer programs that have been read from the auxiliary memory device 403 into the main memory device 402. The main memory device 402 is a memory such as a ROM or a PAM. The auxiliary memory device 303 is an HDD or a memory card.

The display device 404 displays the state of the application key management device 20, the key management inspection device 40, the key integrated management device 60, or the key management log collection device 70. The input device 405 receives a user input.

The communication IF 406 is an interface for establishing connection with a transmission path.

The computer programs executed in the application key management devices 20, the key management inspection devices 40, and the key integrated management device 60 according to the first and second embodiments as well as in the key management log collection device 70 according to the second embodiment are stored as installable files or executable files in a computer-readable memory medium such as a compact disc read only memory (CD-ROM), a memory card, a compact disc recordable (CD-R), or a digital versatile disc (DVD); and are provided as a computer program product.

Alternatively, the computer programs executed in the application key management devices 20, the key management inspection devices 40, and the key integrated management device 60 according to the first and second embodiments as well as in the key management log collection device 70 according to the second embodiment can be stored in a downloadable manner in a computer connected to a network such as the Internet.

Still alternatively, the computer programs executed in the application key management devices 20, the key management inspection devices 40, and the key integrated management device 60 according to the first and second embodiments as well as in the key management log collection device 70 according to the second embodiment can be distributed via a network such as the Internet without involving the downloading step.

Still alternatively, the computer programs executed in the application key management devices 20, the key management inspection devices 40, and the key integrated management device 60 according to the first and second embodiments as well as in the key management log collection device 70 according to the second embodiment can be stored in advance a ROM.

A computer program executed in the quantum cryptography device 10 is of a module configuration including computer-program-realizable functions, from among the functional configuration of the quantum cryptography device 10 according to the embodiments. The functions that are implemented using the computer program are loaded into the main memory device 302 when the control device 301 reads the computer program from a memory medium such as the auxiliary memory device 303 and executes it. That is, the functions implemented using a computer program are generated in the main memory device 302.

Similarly, a computer program executed in each of the application key management devices 20, the key management inspection devices 40, the key integrated management device 60, and the key management log collection devices 70 includes modules of the functions, from among the concerned functional configuration according to the embodiments, that can be implemented using the computer program. The functions that are implemented using the computer program are loaded into the main memory device 402 when the control device 401 reads the computer program from a memory medium such as the auxiliary memory device 403 and executes it. That is, the functions implemented using a computer program are generated in the main memory device 402.

Meanwhile, some or all of the functions of the application key management devices 20, the key management inspection devices 40, the key integrated management device 60, and the key management log collection devices 70 can be implemented using hardware such as an integrated circuit (IC). An IC is, for example, a processor for performing dedicated operations.

In the case of implementing the functions using a plurality of processors, each processor can implement one of the functions or can implement two or more functions.

Meanwhile, the application key management devices 20, the key management inspection devices 40, the key integrated management device 60, and the key management log collection devices 70 can have an arbitrary operation mode. For example, the application key management devices 20, the key management inspection devices 40, the key, integrated management device 60, and the key management log collection devices 70 can be operated as a quantum cryptographic communication system for implementing cryptographic communication of a cloud system in a network.

While certain embodiments have been described, these embodiments have been presented by way of example only, and are not intended to limit the scope of the inventions. Indeed, the novel embodiments described herein may be embodied is a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum cryptographic communication system comprising:
   a key integrated management device;
   a plurality of quantum cryptography devices; and
   a plurality of key management inspection devices, wherein
   each of the plurality of key management inspection devices inspects a quantum cryptographic key generated by one of the plurality of quantum cryptography devices, and
   each of the plurality of key management inspection devices includes one or more hardware processors configured to function at least as:
      an inspection-target-value calculating unit that calculates an inspection target value based on quantum cryptography device information related to a quantum cryptography device,
      an expected-value calculating unit that calculates an expected value based on at least one of
         wiring information of a quantum cryptographic key distribution (QKD) link connected to the quantum cryptography device to be inspected,
         weather information at a site installed with the quantum cryptography device to be inspected, and
         the quantum cryptography device information,
      a permissible-value calculating unit that calculates a permissible value based on at least one of the wiring information, the weather information, and the quantum cryptography device information, and
      a determining unit that
         determines whether or not the inspection target value is within a range of (the expected value)−(the permissible value) and within a range of (the expected value)+(the permissible value), and
         when the inspection target value is outside the range of (the expected value)−(the permissible value) and outside the range of (the expected value)+(the permissible value), transmits anomaly detection to the key integrated management device.

2. The quantum cryptography communication system according to claim 1, wherein
   the quantum cryptography device information contains generation speeds of quantum cryptographic keys, and
   the inspection-target-value calculating unit calculates an average value of the generation speeds as the inspection target value.

3. The quantum cryptographic communication system according to claim 2, wherein
   the wiring information contains
   correspondence data indicating a correspondence of a propagation loss of entire optical fiber constituting the QKD link and the generation speed, and
   the expected-value calculating unit calculates the expected value from the correspondence data.

4. The quantum cryptographic communication system according to claim 2, wherein
   the wiring information contains a wiring state indicating a ratio of an overhead wiring technique to an underground technique of optical fiber constituting the QKD link, and
   the permissible-value calculating unit calculates the permissible value from the wiring state and the weather information.

5. The quantum cryptographic communication system according to claim 4, wherein
   the weather information contains wind force, and
   the permissible-value calculating unit sets the permissible value to be large in proportion to proportion of the overhead wiring technique and in proportion to the wind force.

6. The quantum cryptography communication system according to claim 4, wherein
   the weather information contains an amount of rainfall, and
   the permissible-value calculating unit sets the permissible value to be large in proportion to proportion of the overhead wiring technique and in proportion to the amount of rainfall.

7. The quantum cryptographic communication system according to claim 1, wherein
   the quantum cryptography device information contains generation speeds of quantum cryptographic keys, and
   the inspection-target-value calculating unit calculates a dispersion value of the generation speeds as the inspection target value.

8. The quantum cryptographic communication system according to claim 1, wherein
the quantum cryptography device information contains a Quantum bit error rate (QbER), and
the inspection-target-value calculating unit calculates a dispersion value of QbERs as the inspection target value.

9. The quantum cryptographic communication system according to claim 7, wherein
the wiring information contains a wiring state indicating a ratio of an overhead wiling technique to an underground technique of the optical fiber constituting the QKD link,
the expected-value calculating unit calculates the expected value from the wiring state and the weather information, and
the permissible-value calculating unit calculates the permissible value from the wiring state and the weather information.

10. The quantum cryptographic communication system according to claim 9, wherein
the weather information contains wind force,
the expected-value calculating unit sets the expected value to be large in proportion to proportion of the overhead wiring technique and in proportion to the wind force, and
the permissible-value calculating unit sets the permissible value to be large in proportion to proportion of the overhead wiring technique and in proportion to the wind force.

11. The quantum cryptographic communication system according to claim 9, wherein
the weather information contains an amount of rainfall,
the expected-value calculating unit sets the expected value to be large in proportion to proportion of the overhead wiring technique and in proportion to the amount of rainfall, and
the permissible-value calculating unit sets the permissible value to be large in proportion to proportion of the overhead wiring technique and in proportion to the amount of rainfall.

12. A key management inspection device that inspects a quantum cryptographic key generated by a quantum cryptography device, the key management inspection device comprising:
one or more hardware processors configured to function at least as:
an inspection-target-value calculating unit that calculates an inspection target value based on quantum cryptography device information related to the quantum cryptography device;
an expected-value calculating unit that calculates an expected value based on at least one of
the quantum cryptography device information,
wiring information of a quantum cryptographic key distribution (QKD) link connected to the quantum cryptography device, and
weather information of a site installed with the quantum cryptography device;
a permissible-value calculating unit that calculates a permissible value based on at least one of the quantum cryptography device information, the wiring information, and the weather information; and
a determining unit that
determines whether or not the inspection target value is within a range of (the expected value)−(the permissible value) and within a range of (the expected value)+(the permissible value), and
when the inspection target value is outside the range of (the expected value)−(the permissible value) and outside the range of (the expected value)+(the permissible value), transmits anomaly detection to a key integrated management device.

13. A computer program product having a non-transitory computer readable medium including programmed instructions, wherein the instructions, when executed by a computer that inspects a quantum cryptographic key generated by a quantum cryptography device, cause the computer to function as:
an inspection-target-value calculating unit that calculates an inspection target value based on quantum cryptography device information related to the quantum cryptography device;
an expected-value calculating unit that calculates an expected value based on at least one of
wiring information of a quantum cryptographic key distribution (QKD) link connected to the quantum cryptography device to be inspected,
weather information of a site installed with the quantum cryptography device to be inspected, and
the quantum cryptography device information;
a permissible-value calculating unit that calculates a permissible value based on at least one of the wiring information, the weather information, and the quantum cryptography device information; and
a determining unit that
determines whether or not the inspection target value is within a range of (the expected value)−(the permissible value) and within a range of (the expected value)+(the permissible value), and
when the inspection target value is outside the range of (the expected value)−(the permissible value) and outside the range of (the expected value)+(the permissible value), transmits anomaly detection to a key integrated management device.

* * * * *